United States Patent
Martinotto et al.

(10) Patent No.: US 11,767,896 B2
(45) Date of Patent: Sep. 26, 2023

(54) VEHICLE BRAKING SYSTEMS AND METHODS

(71) Applicant: ITT ITALIA S.r.l., Barge (IT)

(72) Inventors: Luca Martinotto, Legnano (IT); Fabrizio Merlo, Pinerolo (IT); Daniele Donzelli, Luserna San Giovanni (IT)

(73) Assignee: ITT Italia S.R.L., Lainate (IT)

(*) Notice: Subject to any disclaimer, the term of this patent is extended or adjusted under 35 U.S.C. 154(b) by 257 days.

(21) Appl. No.: 17/033,532

(22) Filed: Sep. 25, 2020

(65) Prior Publication Data

US 2021/0148427 A1 May 20, 2021

Related U.S. Application Data

(63) Continuation of application No. 16/787,887, filed on Feb. 11, 2020, now abandoned, which is a (Continued)

(30) Foreign Application Priority Data

Apr. 17, 2013 (IT) .................... TO2013A000307

(51) Int. Cl.
*F16D 66/00* (2006.01)
*F16D 65/00* (2006.01)
(Continued)

(52) U.S. Cl.
CPC .............. *F16D 66/00* (2013.01); *B60T 17/22* (2013.01); *F16D 65/0006* (2013.01); (Continued)

(58) Field of Classification Search
CPC .. F16D 55/225; F16D 65/0006; F16D 65/092; F16D 65/08; F16D 66/00; (Continued)

(56) References Cited

U.S. PATENT DOCUMENTS

| 2,117,027 A | 5/1938 | Langbein |
| 2,289,954 A * | 7/1942 | Arndt, Jr. ................ H03H 9/60 |
| | | 310/366 |

(Continued)

FOREIGN PATENT DOCUMENTS

| CN | 1678893 | 10/2005 |
| CN | 102317130 | 1/2012 |

(Continued)

OTHER PUBLICATIONS

DE-102006053489, English machined translation of specification, May 15, 2008.*

(Continued)

*Primary Examiner* — Nicholas J Lane
*Assistant Examiner* — San M Ng
(74) *Attorney, Agent, or Firm* — Knobbe, Martens, Olson & Bear, LLP

(57) ABSTRACT

A method in which at least one piezoceramic sensor, which converts every mechanical force to which it is subjected into an electrical signal and having a Curie temperature higher than 200° C., is solidarized directly onto the surface of a metal support element of a vehicle braking element, which during use faces a vehicle element to be braked. While in contact with such a surface, an electrical circuit is implemented that picks up and eventually processes the electrical signal, the electrical circuit being connected with a connector integrated with the metal support element. An electrically insulating layer sandwiches the at least one piezoceramic sensor and the electrical circuit, and a block of friction material with an underlying damping layer is formed upon the electrically insulating layer. After forming the block of friction material, the piezoceramic sensor is polarized by applying a predetermined potential difference thereto by means of the connector.

19 Claims, 2 Drawing Sheets

Related U.S. Application Data continuation of application No. 15/957,515, filed on Apr. 19, 2018, now Pat. No. 10,598,239, which is a continuation of application No. 15/184,806, filed on Jun. 16, 2016, now Pat. No. 9,964,167, which is a continuation of application No. 14/106,262, filed on Dec. 13, 2013, now Pat. No. 9,415,757, which is a continuation of application No. PCT/IB2013/060881, filed on Dec. 12, 2013.

(51) Int. Cl.
| | |
|---|---|
| *F16D 66/02* | (2006.01) |
| *F16D 69/00* | (2006.01) |
| *F16D 65/08* | (2006.01) |
| *F16D 65/092* | (2006.01) |
| *G01L 1/16* | (2006.01) |
| *G01L 5/28* | (2006.01) |
| *B60T 17/22* | (2006.01) |
| *G01L 5/22* | (2006.01) |

(52) U.S. Cl.
CPC ........... *F16D 65/08* (2013.01); *F16D 65/092* (2013.01); *F16D 66/026* (2013.01); *F16D 69/00* (2013.01); *G01L 1/16* (2013.01); *G01L 5/225* (2013.01); *G01L 5/28* (2013.01); *F16D 2066/001* (2013.01); *F16D 2066/005* (2013.01); *F16D 2069/006* (2013.01); *Y10T 29/42* (2015.01)

(58) Field of Classification Search
CPC .... F16D 66/021; F16D 66/026; F16D 66/028; F16D 69/00; F16D 2066/001; F16D 2066/003; F16D 2066/005; F16D 2066/006; F16D 2069/006; B60T 8/885; B60T 17/22; B60T 2270/406; G01L 1/16; G01L 5/28; G01L 5/225; G01L 5/284
USPC ..................................................... 188/1.11 E
See application file for complete search history.

(56) References Cited

U.S. PATENT DOCUMENTS

| | | | |
|---|---|---|---|
| 3,689,880 A | 9/1972 | McKee et al. |
| 3,724,916 A | 4/1973 | Hirzel |
| 3,902,157 A | 8/1975 | Kita et al. |
| 4,023,864 A | 5/1977 | Lang et al. |
| 4,117,451 A | 9/1978 | Sato et al. |
| 4,298,857 A | 11/1981 | Robins et al. |
| 4,456,098 A | 6/1984 | Lindre |
| 4,484,280 A | 11/1984 | Brugger et al. |
| 4,495,434 A | 1/1985 | Diepers et al. |
| 4,602,702 A | 7/1986 | Ohta et al. |
| 4,623,044 A | 11/1986 | Ohta et al. |
| 4,649,370 A | 3/1987 | Thomason |
| 4,782,319 A * | 11/1988 | Dell'Acqua | G01L 9/0055 338/42 |
| 4,854,424 A | 8/1989 | Yamatoh et al. |
| 4,869,350 A | 9/1989 | Fargier et al. |
| 4,901,055 A | 2/1990 | Rosenberg et al. |
| 4,928,030 A * | 5/1990 | Culp | H02N 2/142 310/317 |
| 5,090,518 A | 2/1992 | Schenk et al. |
| 5,099,962 A | 3/1992 | Furusu et al. |
| 5,115,162 A | 5/1992 | Leonard et al. |
| 5,133,431 A | 7/1992 | Braun |
| 5,176,034 A | 1/1993 | Hazony et al. |
| 5,235,135 A | 8/1993 | Knecht et al. |
| 5,302,940 A | 4/1994 | Chen |
| 5,325,011 A | 6/1994 | Kahn |
| 5,404,067 A | 4/1995 | Stein |
| 5,406,682 A | 4/1995 | Zimnicki et al. |
| 5,416,415 A | 5/1995 | Dorri et al. |
| 5,419,415 A | 5/1995 | Lamb et al. |
| 5,660,215 A | 8/1997 | Nishikawa et al. |
| 5,719,577 A | 2/1998 | Pitot et al. |
| 5,839,545 A | 11/1998 | Preston et al. |
| 6,064,970 A | 5/2000 | McMillan et al. |
| 6,122,585 A | 9/2000 | Ono et al. |
| 6,179,091 B1 | 1/2001 | Takanashi |
| 6,204,786 B1 | 3/2001 | Bieth et al. |
| 6,247,560 B1 | 6/2001 | Bunker |
| 6,310,545 B1 | 10/2001 | Sapir |
| 6,339,956 B1 | 1/2002 | Huinink et al. |
| 6,345,225 B1 | 2/2002 | Bohm et al. |
| 6,414,818 B1 | 7/2002 | Tanimoto |
| 6,477,893 B1 | 11/2002 | Djordjevic |
| 6,529,803 B2 | 3/2003 | Meyers et al. |
| 6,549,126 B2 | 4/2003 | Hageman et al. |
| 6,612,736 B2 | 9/2003 | Lee et al. |
| 6,668,983 B2 | 12/2003 | Drennen et al. |
| 6,681,631 B2 | 1/2004 | Apel |
| 6,813,581 B1 | 11/2004 | Snyder |
| 6,823,242 B1 | 11/2004 | Ralph |
| 6,934,618 B2 | 8/2005 | Eckert et al. |
| 7,124,639 B1 | 10/2006 | Kurtz et al. |
| 7,127,948 B2 | 10/2006 | Tavares et al. |
| 7,331,427 B2 | 2/2008 | Mohr |
| 7,451,653 B1 | 11/2008 | Sippola |
| 7,694,555 B2 | 4/2010 | Howell et al. |
| 8,026,802 B2 | 9/2011 | Shimura |
| 8,287,055 B2 | 10/2012 | Lee |
| 8,310,356 B2 | 11/2012 | Evans et al. |
| 8,437,934 B2 | 5/2013 | Degenstein |
| 8,573,045 B2 | 11/2013 | Gotschlich |
| 8,676,721 B2 | 3/2014 | Piovesan et al. |
| 8,717,158 B2 | 5/2014 | Roach |
| 8,729,938 B2 | 5/2014 | Watanabe |
| 8,789,896 B2 | 7/2014 | Albright et al. |
| 8,958,966 B2 | 2/2015 | Nohira et al. |
| 9,187,099 B2 | 11/2015 | Powers et al. |
| 9,269,202 B2 | 2/2016 | Phelan et al. |
| 9,286,736 B2 | 3/2016 | Punjabi et al. |
| 9,316,278 B2 | 4/2016 | Moore et al. |
| 9,353,815 B1 | 5/2016 | Eden |
| 9,415,757 B2 | 8/2016 | Martinotto et al. |
| 9,635,467 B2 | 4/2017 | Miyoshi et al. |
| 9,827,961 B2 | 11/2017 | Spieker et al. |
| 9,939,035 B2 | 4/2018 | Serra et al. |
| 9,964,167 B2 | 5/2018 | Martinotto et al. |
| 9,988,024 B2 | 6/2018 | Schwartz et al. |
| 10,052,957 B2 | 8/2018 | Azzi |
| 10,138,968 B2 | 11/2018 | Serra et al. |
| 10,208,822 B2 | 2/2019 | Donzelli et al. |
| 10,224,128 B2 | 3/2019 | Lee |
| 10,227,064 B2 | 3/2019 | Serra et al. |
| 10,295,006 B2 | 5/2019 | Serra et al. |
| 10,408,292 B2 | 9/2019 | Donzelli et al. |
| 10,451,130 B2 | 10/2019 | Solari et al. |
| 10,495,168 B2 | 12/2019 | Serra et al. |
| 10,598,239 B2 | 3/2020 | Martinotto et al. |
| 10,677,304 B2 | 6/2020 | Donzelli et al. |
| 10,777,304 B2 | 9/2020 | Baym et al. |
| 10,955,017 B2 | 3/2021 | Serra et al. |
| 11,047,440 B2 | 6/2021 | Serra et al. |
| 11,441,629 B2 | 9/2022 | Solari et al. |
| 2001/0042661 A1 | 11/2001 | Treyde |
| 2001/0049577 A1 | 12/2001 | Kesselgruber |
| 2002/0047496 A1 | 4/2002 | Wierach |
| 2002/0095253 A1 | 7/2002 | Losey et al. |
| 2002/0104717 A1 | 8/2002 | Borugian |
| 2003/0111305 A1 | 6/2003 | Drennen et al. |
| 2004/0015283 A1 * | 1/2004 | Eckert | B60T 8/00 701/70 |
| 2004/0041464 A1 | 3/2004 | Eckert et al. |
| 2004/0187591 A1 | 9/2004 | Baumann et al. |
| 2004/0238299 A1 | 12/2004 | Ralea et al. |
| 2004/0242803 A1 | 12/2004 | Ohme et al. |
| 2005/0029056 A1 | 2/2005 | Baumgartner et al. |
| 2005/0103580 A1 | 5/2005 | Kramer |
| 2005/0236104 A1 | 10/2005 | Tanaka |

(56) References Cited

U.S. PATENT DOCUMENTS

| | | |
|---|---|---|
| 2005/0251306 A1 | 11/2005 | Gowan et al. |
| 2006/0016055 A1 | 1/2006 | Wilkie et al. |
| 2006/0076196 A1 | 4/2006 | Palladino |
| 2006/0254868 A1 | 11/2006 | Thiesing et al. |
| 2007/0024113 A1 | 2/2007 | Thrush |
| 2007/0228824 A1 | 10/2007 | Yasukawa et al. |
| 2007/0235268 A1 | 10/2007 | Caron |
| 2007/0284713 A1 | 12/2007 | Ninomiya et al. |
| 2008/0246335 A1 | 10/2008 | Spieker et al. |
| 2009/0033146 A1 | 2/2009 | Rieth et al. |
| 2009/0133971 A1 | 5/2009 | Baier-Welt |
| 2009/0157358 A1 | 6/2009 | Kim |
| 2009/0187324 A1 | 7/2009 | Lu et al. |
| 2009/0218179 A1 | 9/2009 | Yokoyama et al. |
| 2009/0223282 A1 | 9/2009 | Yamazaki |
| 2009/0289529 A1 | 11/2009 | Ito |
| 2010/0032898 A1 | 2/2010 | Gearty |
| 2010/0186938 A1 | 7/2010 | Murata et al. |
| 2010/0210745 A1 | 8/2010 | McDaniel |
| 2010/0211249 A1 | 8/2010 | McClellan |
| 2010/0250081 A1 | 9/2010 | Kinser et al. |
| 2010/0318258 A1 | 12/2010 | Katayama et al. |
| 2011/0050406 A1 | 3/2011 | Hennig et al. |
| 2011/0125381 A1 | 5/2011 | Szell et al. |
| 2012/0055257 A1 | 3/2012 | Shaw-Klein |
| 2013/0013348 A1 | 1/2013 | Ling et al. |
| 2013/0018266 A1 | 1/2013 | Nishikubo |
| 2013/0048443 A1 | 2/2013 | Muramatsu et al. |
| 2013/0192933 A1 | 8/2013 | King et al. |
| 2014/0097951 A1 | 4/2014 | Grgic |
| 2014/0200784 A1 | 7/2014 | Nohira et al. |
| 2014/0257605 A1 | 9/2014 | Beck et al. |
| 2014/0311833 A1 | 10/2014 | Martinotto et al. |
| 2014/0337086 A1 | 11/2014 | Asenjo et al. |
| 2015/0112515 A1 | 4/2015 | Conway |
| 2016/0014526 A1 | 1/2016 | Miyoshi et al. |
| 2016/0084331 A1 | 3/2016 | Merlo et al. |
| 2016/0146279 A1 | 5/2016 | Philpott |
| 2016/0272176 A1 | 9/2016 | Furuyama |
| 2016/0341622 A1 | 11/2016 | Mensa |
| 2017/0052028 A1 | 2/2017 | Choudhury et al. |
| 2017/0082164 A1 | 3/2017 | Serra et al. |
| 2017/0082165 A1 | 3/2017 | Donzelli et al. |
| 2017/0082166 A1 | 3/2017 | Serra et al. |
| 2017/0082167 A1 | 3/2017 | Serra et al. |
| 2017/0267220 A1 | 9/2017 | Serra et al. |
| 2017/0331030 A1 | 11/2017 | Inoue et al. |
| 2018/0106319 A1 | 4/2018 | Solari et al. |
| 2018/0160248 A1 | 6/2018 | Murakami et al. |
| 2018/0244159 A1 | 8/2018 | Satterthwaite et al. |
| 2019/0003541 A1 | 1/2019 | Serra et al. |
| 2019/0005743 A1 | 1/2019 | Serra et al. |
| 2019/0078630 A1 | 3/2019 | Serra et al. |
| 2019/0241166 A1 | 8/2019 | Serra et al. |
| 2019/0249736 A1 | 8/2019 | Donzelli et al. |
| 2019/0338818 A1 | 11/2019 | Serra et al. |
| 2019/0351889 A1 | 11/2019 | Serra et al. |
| 2020/0124124 A1 | 4/2020 | Serra et al. |
| 2021/0348666 A1 | 11/2021 | Serra et al. |
| 2021/0388878 A1 | 12/2021 | Serra et al. |
| 2022/0364620 A1 | 11/2022 | Solari et al. |

FOREIGN PATENT DOCUMENTS

| | | |
|---|---|---|
| CN | 102658812 | 9/2012 |
| CN | 102785648 | 11/2012 |
| CN | 104813060 | 2/2018 |
| CN | 104821372 | 6/2018 |
| DE | 100 06 012 A1 | 9/2000 |
| DE | 10230008 A1 | 1/2004 |
| DE | 10243127 A1 | 3/2004 |
| DE | 10259629 A1 | 7/2004 |
| DE | 10 2005 052630 A1 | 3/2007 |
| DE | 10 2006 018 952 A1 | 10/2007 |
| DE | 10 2006 053 489 B4 | 5/2008 |
| DE | 10 2010 010482 A1 | 8/2011 |
| DE | 102011006002 | 9/2012 |
| DE | 10-2012-007118 | 10/2013 |
| EP | 0 189 076 A2 | 7/1986 |
| EP | 0 601 681 A1 | 6/1995 |
| EP | 0744558 A1 | 11/1996 |
| EP | 0781936 | 7/1997 |
| EP | 1431606 A1 | 6/2004 |
| EP | 1530037 A1 | 5/2005 |
| EP | 1531110 A2 | 5/2005 |
| EP | 1923592 B1 | 5/2008 |
| EP | 2647866 | 10/2013 |
| EP | 2741063 A1 | 6/2014 |
| EP | 2778462 A1 | 9/2014 |
| EP | 2570691 A1 | 10/2014 |
| FR | 2815040 A1 | 4/2002 |
| GB | 2309057 A | 7/1997 |
| GB | 2372825 A | 9/2002 |
| GB | 2478423 A | 9/2011 |
| JP | S57-011143 | 1/1982 |
| JP | S58-206458 | 12/1983 |
| JP | S61275049 | 12/1986 |
| JP | 04-054326 | 2/1992 |
| JP | H07-002107 | 1/1995 |
| JP | H09-002240 | 1/1997 |
| JP | H11 94707 A | 4/1999 |
| JP | H11-125285 | 5/1999 |
| JP | 2002-130348 A | 5/2002 |
| JP | 2002-538039 | 11/2002 |
| JP | 2003-104139 | 4/2003 |
| JP | 2003-205833 | 7/2003 |
| JP | 2005-035344 | 2/2005 |
| JP | 2006-193091 A | 7/2006 |
| JP | 2007-224988 | 9/2007 |
| JP | 2011-116237 | 6/2011 |
| JP | 2012-202983 | 10/2012 |
| JP | 2014-234158 | 12/2014 |
| JP | 2016-516631 | 6/2016 |
| JP | 2016-521336 | 7/2016 |
| KR | 10-2002-0051429 | 6/2002 |
| KR | 10-2007-0027041 | 3/2007 |
| KR | 10-0791632 | 12/2007 |
| KR | 2009-0057640 A | 6/2009 |
| KR | 10-2004-48957 A | 6/2010 |
| KR | 2011-0043849 A | 4/2011 |
| KR | 10-2013-0039804 | 4/2013 |
| KR | 10-2015-0045047 | 4/2015 |
| KR | 10-2016-0174510 | 12/2016 |
| KR | 10-2015-0143696 | 12/2019 |
| WO | WO 1999/08018 | 2/1999 |
| WO | WO 2004/027433 | 4/2004 |
| WO | WO-2011116303 A1 * | 9/2011 ............ G01K 13/20 |
| WO | WO 2014/170726 A1 | 10/2014 |
| WO | WO 2014/170849 A1 | 10/2014 |
| WO | WO 2015/013217 A1 | 1/2015 |
| WO | WO 2016/038533 A1 | 3/2016 |
| WO | WO 2016/189150 | 12/2016 |
| WO | WO 2018/019438 | 2/2018 |
| WO | WO2019/171289 | 9/2019 |

OTHER PUBLICATIONS

U.S. Appl. No. 16/020,680 and its entire file history, filed Jun. 27, 2018, Donzelli et al.
International Search Report in PCT Application No. PCT/EP2016/071865 dated Dec. 13, 2016 in 3 pages.
Chinese Office Action in Chinese Application No. 201680054121.1 dated Mar. 26, 2019 in 9 pages.
Chinese Office Action in Chinese Application No. 201680054121.1 dated Feb. 3, 2020 in 8 pages.
Chinese Office Action in Chinese Application No. 201680054121.1 dated Nov. 4, 2020 in 8 pages.
Chinese Office Action in Chinese Application No. 201680054121.1 dated Jan. 19, 2021 in 28 pages.
European Office Action in European Application No. 16770243.0 (Ref. B17603) dated Oct. 15, 2019 in 5 pages.
European Office Action in European Application No. 16770243.0 (Ref.B17603) dated Jan. 12, 2020 in 3 pages.

(56) References Cited

OTHER PUBLICATIONS

European Office Action in European Application No. 16770243.0 (Ref.B17603) dated Jun. 23, 2020 in 5 pages.
Indian Office Action Indian Application No. 201837009364 (PCC15904) dated Nov. 20, 2020 in 15 pages.
Official European Communication in European Application No. 16770243.0 dated Oct. 19, 2020 in 11 pages.
Written Opinion in PCT Application No. PCT/EP2016/071865 dated Dec. 13, 2020 in 6 pages.
Written Opinion in Japanese Application No. 2018513655 dated Oct. 12, 2020 in 4 pages.
Written Amendment in Japanese Application No. 2018513655 dated Oct. 12, 2020 in 5 pages.
Japanese Office Action in Japanese Application No. 2018513655 dated Jul. 14, 2020 in 16 pages.
Japanese Search Report in Japanese Application No. 2018513655 (0022000625) dated May 25, 2020 in 12 pages.
Italian Search Report and Written Opinion for Application No. IT201900015839, dated Apr. 21, 2020, in 6 pages.
English translation of specification EP 1431606.
English translation of specification of DE 10 2006 053 489.
European Search Report; European Application No. EP 14158449; dated Aug. 6, 2014.
International Search Report; International Application No. PCT/IB2013/060881; dated Jul. 3, 2014.
International Search Report; International Application No. PCT/IB2014/060778; dated Aug. 6, 2014.
International Search Report; International Application No. PCT/IB2015/056861; dated Jan. 18, 2016.
Italian Search Report and Written Opinion for IT TO2013A000307; dated Mar. 7, 2014, in 3 pages.
Italian Search Report and Written Opinion for Italian Patent Application No. IT UB20151029; dated May 28, 2015; 8 pages.
Italian Search Report and Written Opinion for Italian Patent Application No. IT UB201510291; dated May 28, 2015; 7 pages.
Italian Search Report and Written Opinion for Italian Patent Application No. IT UB20151059; dated May 28, 2015; 7 pages.
Italian Search Report and Written Opinion for Italian Patent Application No. IT UB20151184; dated May 28, 2015; 7 pages.
Italian Search Report and Written Opinion for ITTO 20130307; dated Mar. 7, 2014; 7 pages.
Italian Search Report Coversheet for Italian Patent Application No. 102015000018714/ITUB20151184; dated Jan. 26, 2016; 1 page.
Italian Search Report Coversheet for Italian Patent Application No. 102015000018748/ITUB20151291; dated Feb. 3, 2016; 1 page.
Italian Search Report Coversheet Italian Patent Application No. 102015000018701 ITUB20151029; dated Feb. 3, 2016; 1 page.
Italian Search Report for Italian Patent Application No. 102015000018771 (UB20151059); dated Jan. 27, 2016; 1 page.
Italian Search Report for Italian Patent Application No. IO 56568 IT (UB20151059); dated Jan. 27, 2016; 1 page.
Italian Search Report for Italian Patent Application No. IO 56568 IT UB20151059; dated Jan. 20, 2016; 7 pages.
Italian Search Report for Italian Patent Application No. IO 56584/ITUB20151184; dated Jan. 14, 2016; 7 pages.
Italian Search Report for Italian Patent Application No. IO 56597/ITUB20151291; dated Jan. 25, 2016; 7 pages.
Italian Search Report Italian Patent Application No. IO 56565/ITUB20151029; dated Jan. 22, 2016; 8 pages.
Von Wagner, et al.: Active Control of Brake Squeal Via "Smart Pads"; Oct. 10, 2004.
"The Next Generation of Hub Units"; SKF Group; 2012, www.vsm.skf.com; 32 pages.
Solyom, Stefan, et al.; "Synthesis of a Model-Based Tire Slip Controller"; 2004; Vehicle System Dynamics, pp. 475-499; http://dx.doi.org/10.1080/00423110512331 3868.
Gustafsson, Fredrik; "Slip-based Tire-Road Friction Estimation"; Automatica, 1997; vol. 33, No. 6; pp. 1087-1099.

Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Capra, D. et al.; An ABS Control Logic Based on Wheel Force Measurement. In: Vehicle System Dynamics; vol. 50, No. 12, pp. 1779-1796; http://porto.polito.it/2497487/.
Ait-Hammouda, Islam; "Jumps and Synchronization in Anti-Lock Brake Algorithms"; Oct. 2008, Japan, 7 pages; https://hal.archives-ouvertes.fr/hal-00525788.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; pp. 81-97.
Ray, Laura; "Nonlinear Tire Force Estimation and Road Friction Identification: Simulation and Experiments"; Automatica, vol. 33, No. 10, pp. 1819-1833; 1997.
Italian Search Report, IO 58761 (IT UB20153706), dated May 25, 2016, 8 pages.
Italian Search Report, IO 58837 (IT UB20153709), dated May 31, 2016, 7 pages.
International Search Report and Written Opinion; International Application No. PCT/EP2017/054455, filed on Feb. 27, 2017; dated May 3, 2017.
International Search Report and Written Opinion; International Application No. PCT/EP2017/059238; dated Aug. 10, 2017.
Chinese Office Action in Chinese Application No. 201780011871.5, dated Jun. 17, 2020 in 15 pages.
Chinese Search Report in Chinese Application No. 201780011871.5, dated Jun. 10, 2020 in 2 pages.
Chinese Office Action in Chinese Application No. 201980033093.9, dated Sep. 28, 2021, in 14 pages.
Chinese Office Action in Chinese Application No. 201980033093.9, dated Feb. 16, 2022, in 13 pages.
European Search Report and Opinion for EP Application No. 20193831.3, in 2 pages.
Written Opinion in Japanese Application No. 2018-545192, dated Feb. 24, 2021, in 6 pages.
Office Action with English translation issued in Korean Application No. 10-2019-7004821, dated Feb. 10, 2021, in 18 pages.
Second Office Action with English translation in Chinese Application No. 201780045954.6, in 14 pages.
Search Report with English translation in Japanese Application No. JP 2019-503519, dated Dec. 10, 2020, in 22 pages.
Office Action with English translation in Japanese Application No. 2019-503519, dated Dec. 23, 2020, in 20 pages.
First Office Action with English translation in Chinese Application No. 201780045954.6, in 15 pages.
Japanese Written Amendment in Japanese Application No. 2018545192, dated Feb. 24, 2021 in 8 pages.
International Search Report and Written Opinion for Application No. PCT/EP2019/062680, dated Jun. 27, 2019, in 9 pages.
Italian Search Report for Italian Application No. IT 201800005484, dated Feb. 19, 2019, in 7 pages.
Italian Search Report and Written Opinion for Italian Patent Application No. IT 201600077944 (IO 69013); dated May 26, 2017; 8 pages.
Japanese Office Action in Japanese Application No. 2018-545192, dated Jan. 5, 2021, in 17 pages.
PCT International Search Report for PCT Application No. PCT/EP2016/071859, dated Nov. 11, 2016, in 3 pages.
International Preliminary Report on Patentability for PCT Application No. PCT/EP2016/071859, dated Mar. 20, 2018, in 6 pages.
Written Opinion for Japanese Application No. 2018-513768, dated Apr. 16, 2021, in 2 pages.
Notice of Reasons for Refusal for Japanese Application No. 2018-513768, dated Jan. 26, 2021, in 12 pages.
First Office Action in Chinese Application No. 201680052796.2, dated Sep. 19, 2019, in 11 pages.
Second Office Action in Chinese Application No. 201680052796.2, dated Apr. 24, 2020, in 12 pages.
Third Office Action in Chinese Application No. 201680052796.2, dated Feb. 9, 2021, in 9 pages.

(56) References Cited

OTHER PUBLICATIONS

First Office Action in Mexican Application No. MX/a/2018/003309, dated Sep. 4, 2019, in 3 pages.
Second Office Action in Mexican Application No. MX/a/2018/003309, dated Mar. 18, 2020, in 5 pages.
Second Office Action in Chinese Application No. 201780011871.5, dated Feb. 19, 2021, in 8 pages.
Second Office Action in Japanese Application No. 2018-545192, dated Apr. 6, 2021, in 4 pages.
Written Opinion in Japanese Application No. 2018-545192, dated Jun. 21, 2021, in 2 pages.

* cited by examiner

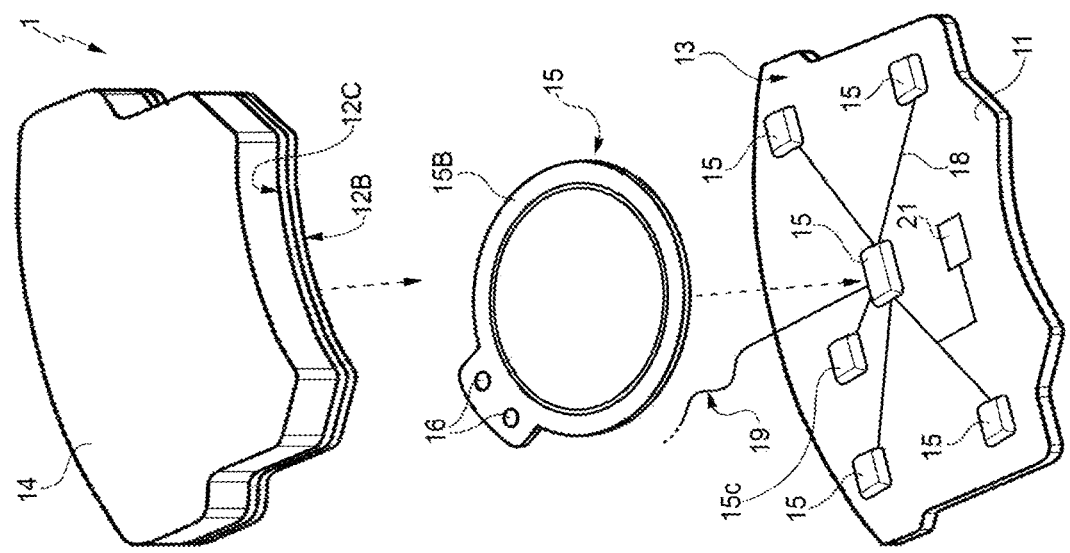
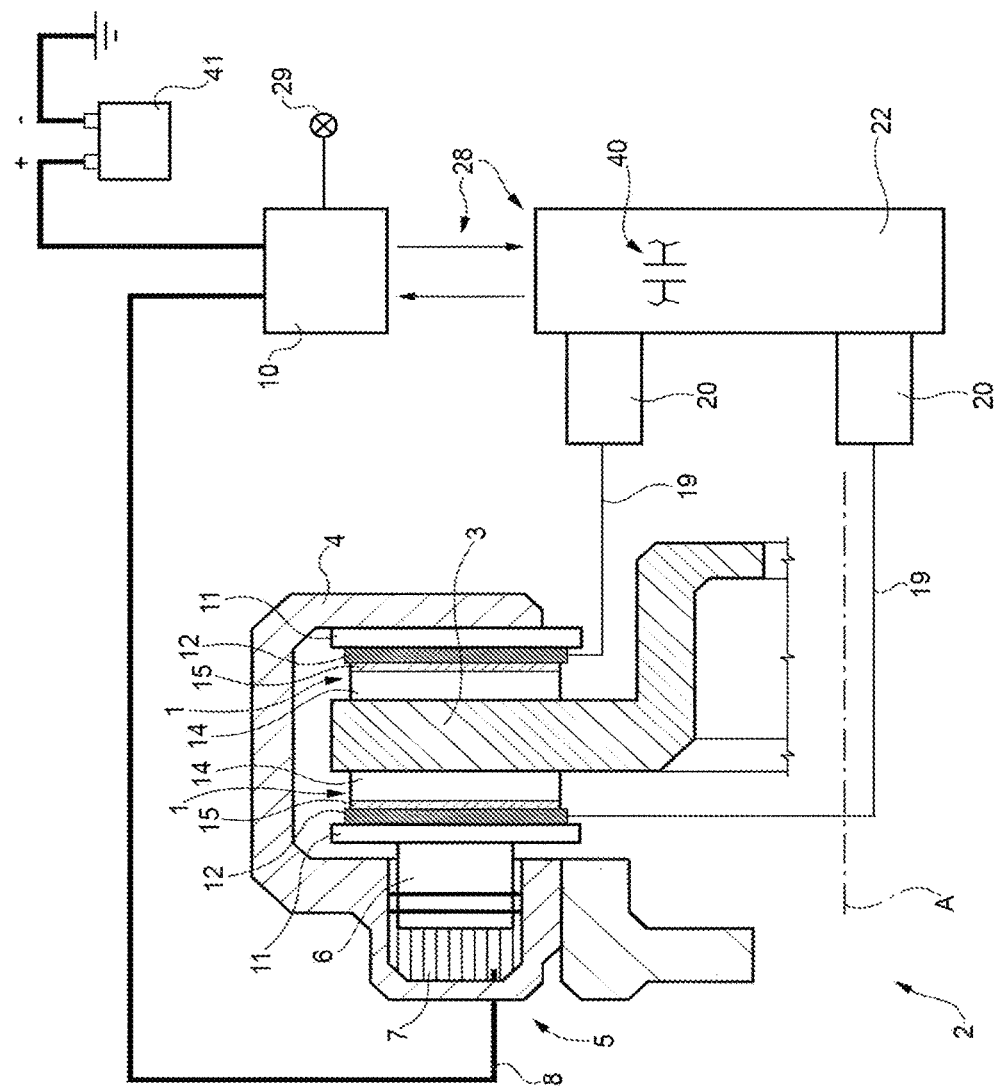

VEHICLE BRAKING SYSTEMS AND METHODS

CROSS REFERENCE TO RELATED APPLICATIONS

This application is a continuation of U.S. application Ser. No. 16/787,887, filed Feb. 11, 2020, which is a continuation of U.S. application Ser. No. 15/957,515, filed Apr. 19, 2018, which is a continuation of U.S. application Ser. No. 15/184,806, filed Jun. 16, 2016, now U.S. Pat. No. 9,964,167, which is a continuation of U.S. application Ser. No. 14/106,262, filed Dec. 13, 2013, which is a continuation of International Application No. PCT/M2013/060881, filed Dec. 12, 2013, which claims priority under the relevant sections of 35 U.S.C. § 119 to Italian Patent Application No. TO2013A000307, filed Apr. 17, 2013. The entire contents of each above-noted application are herein incorporated by reference.

TECHNICAL FIELD

The present invention relates to a method for manufacturing braking elements, in particular brake pads with integrated sensors that allow to detect the forces acting upon brake pads during vehicle braking. The invention also relates to a brake pad integrated with sensors constructed using this method and to a vehicle braking system and associated control method both of which make use of a brake pad with integrated sensor as according to the invention.

BACKGROUND

With the vehicle braking systems currently in production, there is no way to detect while using the vehicle, if not by way of external systems, the forces that are exchanged between the brake pads (or brake shoes for vehicles equipped with drum brakes) and the disc or drum element attached to the wheel that is being braked. This makes it impossible to detect and/or predict the occurrence of many drawbacks which can vary from abnormal brake pad wear due for example to the pads "touching" the disc even when braking is not taking place due to poor caliper adjustment, rather than the noise, vibration and undesirable squealing during braking. These problems can lead to malfunctions or even to premature and often unnecessary brake pad replacement.

KR2004-48957A attempts to solve the problem of the generation of noise and vibration during braking by arranging piezoelectric elements behind the metal support for the brake pad which is known as the "backplate". These piezoelectric elements, as a result of the vibrations to which the backplate is subjected during use, generate electrical energy which is subsequently dissipated by supplying said energy to LEDs. By absorbing energy in this manner these vibrations are dampened.

More generally the use of piezoelectric elements (sensors or actuators) for experimental purposes is known in the art. For example arranging piezoelectric elements against the backplate and facing towards the outer sides of the brake caliper in order to detect the deformations of said backplate during braking bench tests or for counteracting the vibrations that are generated during braking by electrically supplying piezoelectric actuators such that said actuators then apply forces to the backplate that should counterbalance and thus dampen the vibrations.

For example, the SAE Technical Paper 2004-01-2773 describes a study conducted by the University of Darmstadt in which piezoelectric elements are coupled together with acceleration sensors and used both as sensors and actuators for the squealing suppression during braking. The same study points out however that the system described should be considered as a design aid tool and not as a system suitable for use in the mass production of brake pads.

EP1531110 and GB2478423 describe vehicle braking systems wherein piezoelectric sensors are respectively arranged on the brake disc or between the brake caliper piston and backplate so as to produce respectively either a signal that is used by an electric motor to adjust the position of the brake caliper piston or else to rapidly detect any signs of wheel lock during braking.

It should be noted in fact that at the moment it is considered to be extremely difficult, if not impossible, to have piezoelectric sensors in the vicinity of brake pads or on the brake pads themselves, due to the high temperatures and pressures to which brake pads are subjected during the production process or that are developed during braking, resulting in temperatures and pressures that are incompatible with most known piezoelectric sensors.

EP1431606B1 therefore describes a method for the measurement of forces applied to a friction layer where a functional layer, whose electrical resistance varies as a function of the forces applied to it, is associated with said friction layer, then the variation in functional layer electrical resistance is measured thus giving an indication of the amount of applied force.

EP1923592B1 instead describes a braking or friction element having a friction layer and a support plate with at least one capacitive sensor arranged between the friction layer and the support plate, the capacitance of which varies as a function of the force applied to said friction layer.

Finally US2006/0254868 describes a system similar to that of EP 1431606B1 wherein the variation in electrical resistance of a braking element friction layer, such as that of a brake pad, is measured directly.

These systems, which are based on the variation in capacitance or electrical resistance of a sensor or an entire functional layer are however very difficult to be made feasible in practice, because, on one hand they allow for relatively precise measurement of forces applied in static manner or in a very slow acting manner, but they are unable to detect rapid changes in force such as those that occur during braking; and, on the other hand, they also need to be continuously electrically supplied thus leading to associated energy consumption and considerably complicated construction in that electrical energy has to be supplied to relatively fast moving parts.

SUMMARY

The object of the present invention is to provide a simple and economical construction method of brake pads and more generally braking elements, and therefore also brake shoes, wherein it is then possible to detect during use, in real time and in a simple and precise way during braking, without the need of external powering, the presence and/or extent of the forces at the interface between the braking element (pad or shoe) and the element being braked (disc or drum brake).

A further aim of the invention is that of providing a braking element, in particular a sensorized brake pad, that during use is capable of transmitting an electrical signal which is proportional to the braking forces applied to said braking element as a result of coming into contact with the element being braked, a braking element that is both easy to be constructed and easily usable.

Finally, a further object of the invention is to provide a vehicle braking system and associated method wherein it is possible to perform real time active or passive braking control with the aim of eliminating inconveniences such as unwanted vibrations and squeals and/or to indicate abnormal operating conditions.

The invention therefore relates to a method for the simple and economical construction of braking elements, in particular brake pads, with sensors, as defined in the claims. The invention further relates to a braking element, in particular a brake pad, with sensors.

The invention further relates to a vehicle braking system and to an associated control method.

According to a main aspect of the invention, at least one piezoceramic sensor capable of emitting an electrical signal when subjected to a mechanical force and chosen so as to be operative at temperatures equal to or even higher than 200° C. (i.e., selected from a group consisting of piezoceramic sensors with maximum operating temperatures equal to or higher than 200° C.), made therefore of piezoceramic material with a Curie temperature higher than 200° C., is made integral i.e. solidarized directly with/onto a first surface of a metallic support element (so called backplate) of the braking element which surface is intended during use to be directed toward a vehicle element to be braked, such as a disc or drum; furthermore, before or immediately after the step involving the integration of the sensor onto the metal support (backplate), an electrical circuit is implemented upon the first surface in order to picking up and potentially processing the electrical signal from the at least one sensor and the electrical circuit is connected to a connector or to an electrical cable terminating in a connector which are integrated into the metallic support element; subsequently a continuous or discontinuous electrically insulating layer is implemented upon the first surface in such a way as to encase the at least one piezoceramic sensor, together with the electrical circuit, between the first surface and the insulating layer; the at least one piezoceramic sensor and the electrical circuit consequently remain embedded, without interposition of any air bubbles, within the electrically insulating layer; upon the electrically insulating layer, a thermally insulating and damping layer (known as an underlayer) is then formed and above the latter there is finally formed a block of friction material which is held rigid by the metal support; consequently, the at least one sensor together with its relative electrical circuit is embedded directly within the block of friction material from which however, it is separated by means of the electrically insulating layer, which is itself also embedded within the block of friction material; if necessary, after the step of forming the block of friction material a predetermined difference of potential is applied to the at least one piezoceramic sensor via the connector and the possibly present electrical cable, which difference of potential acts to polarize or re-polarize the piezoceramic material of the sensor.

The piezoceramic sensor converts received mechanical energy, in the form for example of force or pressure, into electrical energy and accordingly generates, without the need of a power supply and when constrained to vary its thickness in the direction of application of a force stimulus, a variation of electric charge which is measured as a potential difference, i.e. an electrical voltage signal, or as electric charge, both varying according to the magnitude of the applied force.

The piezoceramic sensors used according to the invention differ from the known piezoceramic accelerometers by the fact that they are deprived of a seismic mass and are formed by the active element only. Moreover, according to the invention, the utilized sensors have to be able to give a real time signal response. For real time it is intended a transduction speed (response time) of the sensor less than 0.16 microseconds, so allowing acquisition frequencies with sequential sampling typical of the acoustic range up to 50 kHz.

According to further aspects of the invention, a plurality of piezoceramic sensors is made integral onto the first surface, eventually by forming them in situ and using exclusively piezoceramic material, the sensors being individually activatable and being spaced apart and preferably arranged according to a symmetrical array. Then, the electrical circuit is connected to a central processing unit, the electrical circuit optionally comprising means to process the voltage or electrical charge signals emitted by the piezoceramic sensors or else being adapted to separately provide the central processing unit with an electrical signal emitted from each sensor.

Following on from this, the development of suitable signal processing algorithms will allow for the detection and/or diagnosis and/or correction of various possible faults and/or malfunctions.

For example, if the vehicle braking system has not been activated but the central processing unit nonetheless receives a signal from one or more sensors, it can be established that the braking element, for example a brake pad, is "touching" the element to be braked, for example a brake disc carried by the wheel of the vehicle. It would then be possible according to the invention to either activate a warning device to alert the user of the abnormality, an abnormality that can be eliminated by a simple mechanical adjustment of the brake calipers for example, or else to automatically intervene upon the braking element actuating mechanism (piston or caliper) so as to retract the braking element with respect to the element being braked. Abnormal brake pad consumption is thus avoided and significant energy savings obtained in driving the vehicle.

A further advantage consists in the fact that, by suitably processing the signal emitted by a plurality of sensors applied to a single braking element according to an array pattern it is possible to detect any vibration and/or abnormal distribution of contact pressure between the brake pad and disc which induce differential wear and/or noises and squeaks. As these conditions usually occur as a result of abnormal pressure distribution and/or of the application of discrete values of contact pressure, it is thereby possible to rebalance the distribution of pressure or in some cases to detect the pressure which triggered the phenomenon and to operate the braking system, for example by acting upon the actuating mechanism of the braking element with the integrated sensor, so as to thereby avoid the application of the pressures that induce said phenomenon, for example by applying higher or lower pressures depending on the driving conditions.

By elaborating the signal from more piezoceramic sensors, i.e. from a set of discrete sensors formed by a plurality of independent piezoceramic sensors at least one of which is designed to react to forces that are transverse to the direction of the pressure applied by the braking element, having been polarized in a direction perpendicular to the polarization direction of the other piezoceramic sensors, it will then be possible to calculate the instantaneous coefficient of friction between the brake pad with the integrated sensor and the disc. With this value being transmitted to the vehicle on-board computer, and it being combined in real time with signals from other systems (ABS, ESP, etc.), this will allow for better control over braking conditions and consequently the stopping distance of the vehicle.

BRIEF DESCRIPTION OF THE DRAWINGS

Further characteristics and advantages of the present invention will become clear from the following description of an exemplary non-limiting embodiment given purely by way of example and with reference to the figures within the accompanying drawings, wherein:

FIG. 1 schematically illustrates a vehicle braking system according to the invention in elevation and partially cutaway view, drawn longitudinally in relation to a wheel axis;

FIG. 2 schematically illustrates, with an enlarged scale, an exploded perspective view of a braking element, in this case a brake pad, constructed according to the invention.

DETAILED DESCRIPTION

Figure 3:
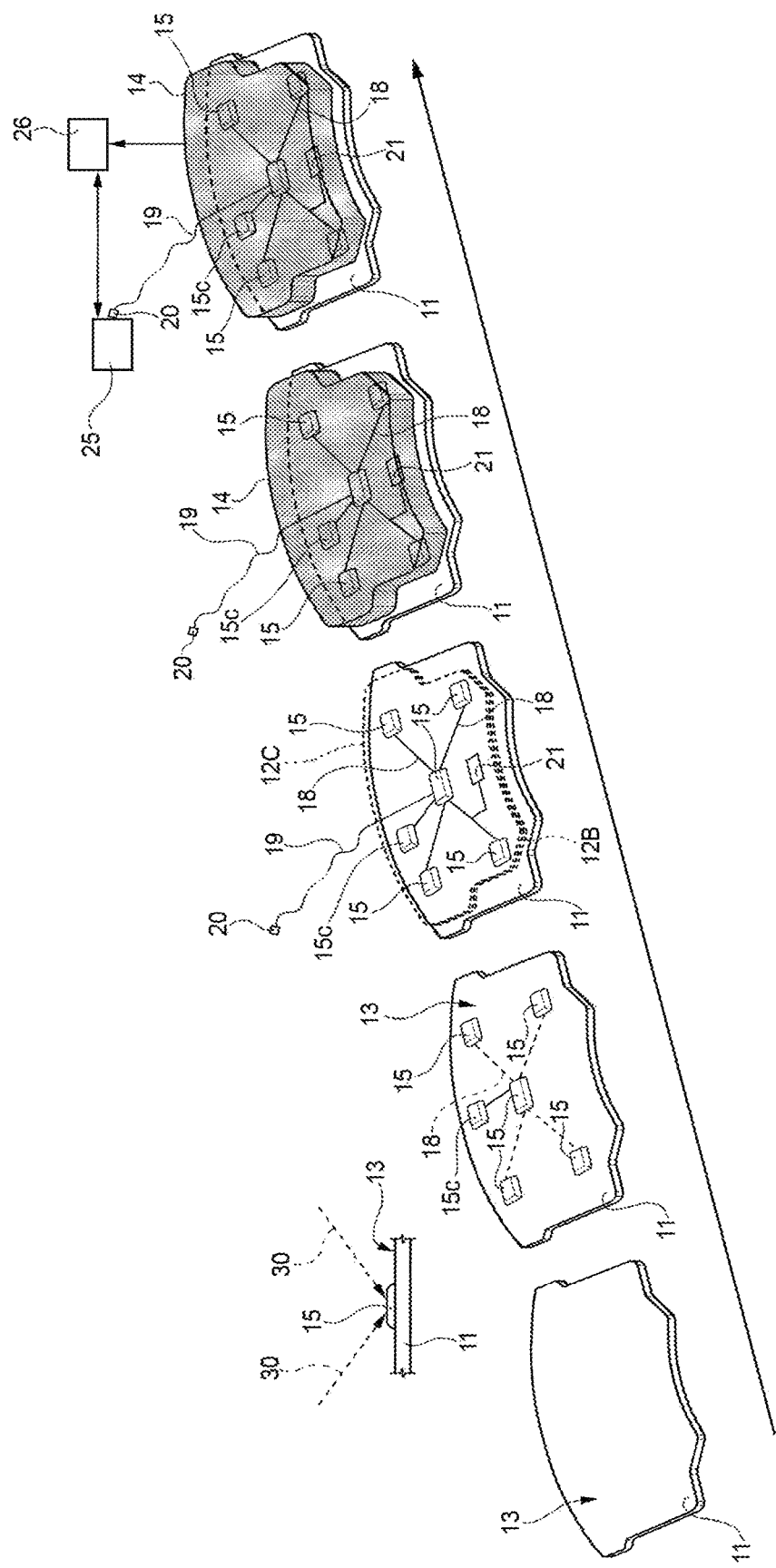
FIG. 3, in the direction of the arrow, schematically illustrates in sequence the succession of steps regarding the method for constructing the brake pad of FIG. 2.

With reference to FIGS. 1 to 3 it is indicated as a whole at 1 a vehicle braking element integrated with sensors, in the shown example a brake pad, which is intended to equip a braking system 2 (FIG. 1), equipped with a disc 3 (disc-braking system); a disc 3 is attached in a known manner to each wheel of the vehicle (not shown for simplicity), and therefore rotates about a wheel axis A.

In addition to the disc 3 and for each disc 3 (therefore for each wheel of the vehicle) the braking system 2 comprises, a brake caliper 4 equipped with an actuator 5, known in the example illustrated to be of the oil-hydraulic type 5 but that can also be of an electrical type, and a pair of brake pads 1 carried by the brake caliper 4 together with the actuator 5, brake pads 1 which in use may be pressed against the disc 3 in a direction parallel to the axis A by means of the actuator 5, so as to brake the rotation of the disc 3, thus braking along with it the wheel to which it is rigidly attached and, consequently, the vehicle equipped with the braking system 2. The actuator 5 described is of the hydraulic type, equipped with a piston 6 that slides within a chamber 7 full of oil, which is pressurized by means of a pipe 8 when a vehicle user presses the brake pedal and that, more generally, is controlled by a vehicle on-board computer 10. Obviously, the actuator 5 may also be of the electrical type in which case it will be directly controlled by the on-board computer 10. It is also clear that what is described here above and below also applies to combined hydraulic-electrical systems.

Both here and below, specific reference will be made to a braking element consisting of a brake pad 1, but it is clear that what will be said is also identically applicable to the brake shoe of a drum brake, so that the braking system 2 described above can also be of a mixed type consisting of two discs 3 only (for example for the front wheels of the vehicle) and two brake drums (known in the art and not shown for simplicity) for the rear wheels, that in use operate with braking elements consisting of brake shoes rather than with brake pads 1.

Also with reference to FIG. 2, a brake pad such as the brake pad 1 usually consists of a metal support element 11, otherwise known as a "backplate", in the form of a flat plate shaped with a contour, a damping and thermally insulating layer 12C, known as an "underlayer" which is arranged over a first surface 13 of the metal support element 11 which in use is intended to be facing toward an element to be braked, in the shown example the disc 3, of a vehicle, and a block 14 made of friction material which is held rigid by the metal support element 11 on the side of the surface 13 and above the known damping/insulating layer or underlayer 12C.

It is clear that in the case of a brake shoe there could be elements corresponding to those described for the brake pad 1 for which, for a person skilled in the art, the following description is easily transferable such that brake shoes with integrated sensor can also be constructed.

According to an aspect of the invention, the brake pad 1 (at least one brake pad 1 for each pair of brake pads used within the braking system 2 according to the invention) has integrated sensor which is used to detect the forces that are exchanged when, during use, contact occurs between the brake pads 1 and the disc 3.

The brake pad 1 according to the invention thus also includes at least one piezoceramic pressure sensor 15, selected according to the invention so as to preferably be individually free from polymers or polymeric components which are necessary for its operation such as polymer films, for example a sensor made entirely of a piezoceramic material having a Curie temperature higher than 200° C., provided with opposing electrical connection electrodes or terminals 16. Polymeric components or films may also be present to the extent that they do not interfere/intervene in the operation of the sensor 15 and serve for example only with regard to its anchorage.

According to the invention, at least one brake pad 1 sensor 15 is made integral directly with the surface 13 of the metal support element 11 and onto the same before constructing the brake pad 1 in its entirety and therefore before forming, using techniques known in the art, the thermally insulating and damping layer 12C and the block of friction material 14; also in combination, before forming the thermally insulating/damping layer 12C a continuous or discontinuous electrically insulating layer 12B within which the at least one sensor 15, which is integrated with the surface 13, remaining completely encased and this without interposition of any air bubbles, is made integral with and above the surface 13.

Above the electrically insulating layer 12B, in a manner known in the art, the layer 12C and the block of friction material 14 are then constructed in such a way as to completely cover the sensor(s) 15 arranged on the surface 13, such that the block 14 becomes integral in one piece with the backplate 11, so that the at least one sensor 15 remains embedded within the damping and thermally insulating layer 12C, incorporated directly within the same with the only interposition of the relative electrically insulating layer 12B. The at least one sensor 15 can occupy only one point on the surface 13 or, alternatively, it can be implemented in the form of a ceramic film that covers all or only part of the surface 13.

In the case illustrated in FIG. 2, the brake pad 1 comprises a discrete set of piezoceramic sensors formed from a plurality of sensors 15 that are independent of each other and directly integrated with the surface 13. The sensors, which can be individually activated, are spaced apart and preferably arranged according to a symmetrical array. The plurality of piezoceramic sensors 15 are pressure sensors which are spaced apart, preferably according to a symmetric array, so as to occupy the entire surface 13, but only in a discrete manner, i.e., in correspondence to predetermined points/limited portions of the same.

According to a preferred aspect of the invention, at least one of the sensors 15, shown in FIGS. 2 and 3 (referred to as 15C), having been polarized in a direction perpendicular to the polarization direction of the other piezoceramic sensors, is thus configured to react to forces that are transverse to the direction of the pressure applied by the braking element 1. In the non-limiting shown example, the sensors 15 are polarized according to a direction perpendicular to the face 13, while the sensor 15C is polarized in a direction parallel to the face 13 and, in particular, in a tangential direction relative to the axis A, i.e., tangential to the brake disc 3 with respect to the direction of rotation of the brake disc 3 about the axis A.

The sensors 15 can be selected from commercial types provided that they are selected from those that are exclusively piezoceramic and, according to one aspect of the invention, must have a thickness, measured perpendicularly to the surface 13, equal to or less than that of the damping layer or underlayer 12C. The sensors are attached to the surface 13 by gluing for example or else by other techniques known in the art.

Alternatively, the sensors 15,15C can be formed directly in situ onto the support element or backplate 11, thus making them integral directly with the surface 13 by sintering, binding them integral in one piece to surface 13. As regards the material used to sinter the piezoceramic sensors 15 a "soft" or "hard" type of PZT (lead zirconate titanate) compound can be used for example or else a bismuth sodium titanate compound or modified lead metaniobate. The list of possible materials provided herein is not exhaustive and any piezoceramic material currently known in the art or that may be available in the future and that meets the above requirements may be used in the present invention.

Again according to the invention, the brake pad 1 also includes an electrical circuit 18 shown in FIG. 2 only in a schematic way and without any relation to reality; the circuit 18, by means of the electrodes or terminals 16, picks up an electrical signal which is produced by the at least one piezoceramic sensor 15 and is eventually capable of processing said signal as will be explained further on. The circuit 18 is arranged so as to be in contact with the surface 13 and with the sensor(s) 15, it is for example formed directly above the first surface 13 before the sensors are integrated with said surface 13 (as illustrated in FIG. 3 by a dashed line) or else it is pre-printed onto the face of the electrically insulating layer 12B facing in use the surface 13 before the layer 12B is deposited onto the surface 13 itself, the layer 12B being constructed in the form of a film, for example by means of techniques known in the art that are used for printed circuits and/or microcircuits (microchip); for example the circuit 18 is screen printed onto the surface 13 or onto the face of the layer 12B facing, during use, the surface 13 and arranged such that it is in contact with the same, and is connected with an electrical cable 19 which is formed integral with the metal support element 11. The electrical cable 19 terminates (FIG. 1) in a connector 20. Alternatively, the electrical circuit 18 can be directly integrally connected to the connector 20 which is itself directly made integral in one piece with the metal support element 11.

In the example illustrated, in which the brake pad 1 comprises a plurality of sensors 15 and at least one sensor 1 SC, all of these are connected together along with the cable 19/connector 20 by means of the electrical circuit 18; the latter is constructed in such a way as to potentially include pre-processing means 21 (indicated by a block in FIG. 2) of the voltage or electric charge signals generated by the plurality of piezoceramic sensors 15,15C; that is to say that the circuit 18 is constructed in such a way as to be capable of separately providing an electrical output signal from each sensor 15 and 15C by means of the cable 19 (in which case the cable 19, if present, will possibly be a flat multi-signal cable) or in any event to the connector 20.

In all cases the at least one sensor 15 (the plurality of sensors 15 and 15C) and the electrical circuit 18 are, as regards the brake pad, sandwiched between the surface 13 of the metal support element 11 and the electrically insulating layer 12B, with the damping layer 12C arranged above, within which the sensor(s) 15,15 C is/are directly encased with the interposition of the electrically insulating layer 12B, and upon which the block of friction material 14 is superimposed and which is rendered integral and made rigid by the metal support element 11 with the interposition of the thermally insulating/damping layer 12C.

Furthermore, according to an essential aspect of the invention, the cable 19, if present, the connector 20 and the electrical circuit 18 are constructed in such a way as to be capable not only of picking up and transmitting the electrical signals generated and emitted, during use, by the sensor(s) 15, but, above all, are also capable of being connected, as shall be seen, to voltage generating means 25 (FIG. 3) in order to polarize and/or re-polarize the sensor(s) 15, which otherwise could remain inert or not perfectly functioning.

In fact, the piezoceramic sensor(s) 15 (15C) selected according to the invention for use in brake pads (braking elements) 1 are not made of materials that naturally exhibit piezoelectric properties but rather only with materials which, thanks to the crystalline structure, take on piezoelectric properties but only after adequate polarization.

The braking system 2 according to the invention, in addition to comprising the elements already indicated, including at least one (two in the illustrated example) brake pad(s) 1 which is/are arranged to interact with the disc 3, can also comprise a central processing unit 22 which is connected in a detachable way to the electrical circuit 18 and to the at least one piezoceramic sensor 15 (with the plurality of sensors 15 and 15C arranged in an array pattern) by means of the connector 20 and the eventually present electrical cable 19 of each brake pad 1.

The central processing unit 22 can be attached directly to the brake caliper 4 for example or else it can form part of a vehicle on-board computer or group of central processing units within the vehicle fitted with the braking system 2. In all cases the central processing unit 22 is connected to (or is an integral part of) the on-board computer 10 that controls the actuators 5 which, during use, push the block of friction material 14 arranged so as to face the element to be braked of each braking element made up of a brake pad 1 (or of a brake shoe in the case of drum brakes against the element to be braked which is defined by the disc 3 (or by a brake drum in the case of drum brakes).

With reference to FIG. 3, it is clear from what has been described that the brake pad 1 (or any similar braking element 1, such as a brake shoe) according to the invention, is constructed by means of the subsequent process or method which is schematically illustrated in FIG. 3. This method or process comprises the following steps:

a) directly made integral with and onto the surface 13 of a metallic support element or backplate 11 of the braking element 1 which is intended during use to be facing toward the element 3 to be braked, at least one piezoceramic sensor 15 which when appropriately polarized is capable of generating and outputting an electrical signal when subjected to a mechanical force, a sensor 15 preferably chosen so as to be free of polymeric components necessary for its operation and fully operational even at temperatures equal to or higher than 200° C.; this step can be completed by simply gluing or otherwise attaching commercial type sensors 15B onto the surface 13 (as illustrated in this non-limiting case in FIG. 2 the sensor 15B is in the form of a ring but the piezoceramic sensors to be used according to the invention can be of various shapes, generally cylindrical for the sensors 15 and rectangular for the tangentially polarized sensor 15C, where the electrodes 16 are constituted by the opposite faces of the base of the sensor 15/15C), or else, as shown in FIG. 3, the sensor(s) 15/(15C) can be made in situ, forming it/them (by sintering) from powder, for example by means of laser beams 30 as according to a construction technique known in the art. In this case, the sensor(s) 15/15C present on the surface 13 and integrally incorporated to the support 11 is/are inactive being still free of piezoelectric properties;

b) constructing a circuit 18 such that it is in contact with the surface 13, for example directly on said surface before integrating onto it the sensors 15 (the circuit is shown as dashed lines in FIG. 3) capable during use of picking up the electrical signal from the sensors 15 and optionally processing it; this circuit 18 is also connected to an electrical cable 19 which is integral with the backplate 11 and terminates in a connector 20, or, as according to a preferred embodiment which is not illustrated for simplicity, the circuit 18 is connected directly to a connector 20 which is made directly integral with the backplate 11;

c) forming an electrically insulating layer 12B on the surface 13 (or part of it) that encases the sensors 15 and the circuit 18, which can be carried pre-printed by layer 12B, so as to sandwich between the surface 13 and the insulating layer 12B both the piezoceramic sensor(s) 15 and the electrical circuit 18;

d) forming on the insulating layer 12C a block of friction material 14 that is held rigid by the metal support element 11; and e) applying, if necessary, to the at least one piezoceramic sensor 15, or to the plurality of sensors 15/15C point by point distributed on the surface 13, by means of the connector 20 and of the eventually present electrical cable 19, a predetermined potential difference capable of initially polarizing or re-polarizing the piezoceramic material that the sensors are made of but only and exclusively at the completion of the construction step of the block of friction material 14.

This final phase e) is carried out in practice upon the finished brake pad 1, in which the block of friction material 14 has already been formed, polymerized, and heat-treated, by connecting the connector 20 to the voltage generation means 25 which is controlled by a central processing unit 26.

When the sensor(s) 15 is/are formed in situ directly on the surface 13, it/they is/are composed exclusively of a piezoceramic material having a Curie temperature higher than 200° C. and it not yet polarized. Step e) as described above is then compulsory.

The polarization/re-polarization phase of the at least one piezoelectric sensor 15, which is the final step of the method according to the invention, is conducted by applying for a predetermined time frame, for example between 5 and 10 seconds, and by means of the cable 19, to the opposing electrodes 16 of the sensor (each sensor) 15, a potential difference that can range from 0.1 to 5 kV per mm of thickness of piezoceramic material of which the sensor 15 is composed. The thickness being measured in the direction of the polarization of the sensor. The preferred thickness for the sensors 15 is about 1 mm, whereby during the polarization phase a 2,500V voltage for example will be applied to the connector 20. The polarization/re-polarization voltage for the tangentially polarized sensor 15C will instead be increased to 12,500V, this is assuming that it has a prismatic shape with a square base of 5 mm per side. Therefore, circuit 18 and connector 20, together with the eventually present cable 19, must be constructed so as to withstand this maximum applicable voltage.

This results in a finished brake pad 1 complete with integrated sensor and without the normal pad forming process interfering with the presence of the sensors 15, which are also optimally positioned to detect the pressures to which the block of friction material 14 is subjected during use and without interfering with the stiffness of the backplate 11 and, therefore with the performance expected from brake pad 1.

With reference once again to FIG. 2, in the braking system according to the invention, the pads 1 are preferably always provided with a plurality of sensors 15 arranged in an array and the electrical circuit 18 comprises suitable means 21 for pre-processing the voltage or electric charge signals generated and transmitted by piezoceramic sensors 15 and then sending a signal along the cable 19 that informs the central processing unit 22 (or any other circuit suitably connected and programmed) of the contact pressure configuration (measured parallel to the axis A for the sensors 15 and on a plane perpendicular to the axis A for the shear forces acting on the sensor 15C) acting on the block 14, or else is configured such that it separately and individually transmits by means of the cable 19/to the connector 20 the signals emitted by all of the sensors 15/15C present, said signals being processed directly by the central processing unit 22.

In all cases the braking system 2 comprises a means 28 for controlling the actuator means 5 in response to an electrical signal sent to the central processing unit 22 from the electrical circuit 18, in its turn in response to the activation of one or more sensors 15 within the array of active piezoceramic sensors located on the surface 13. Said means 28 is defined by the central processing unit 22 itself, and by a two-way connection between the central processing unit 22 and on-board computer 10. Obviously, on-board computer 10, the central processing unit 22 and means 28 can simply be realized through software, by means of a suitable programming of a central processing unit already built-in with the vehicle.

In addition or as an alternative to the above, the braking system 2 may comprise signaling means 29 that can be activated by the central processing unit 22 in response to an electrical signal emitted by at least one active piezoceramic sensor 15 located on the surface 13, without the activation of the actuator means 5, a condition that the central processing unit 22 can verify by means of the connection/interface with the on-board computer 10.

Finally, the braking system 2 can also include capacitive means 40 associated with the central processing unit 22 that, at least with a moving vehicle, are maintained in an electrically charged status by the central processing unit 22, for example by means of the vehicle battery 41 and which are capable, under the control the central processing unit 22, of re-polarizing the single piezoceramic sensor 15/the plurality of piezoceramic sensors 15 located on the surface 13, by means of the cable 19 and the connector 20, in the case where the central processing unit 22 detects a fault or the absence of the signal transmitted by the electrical circuit 18 to the central processing unit 22 when the actuator means 5 are active. This could happen in the case where intensive use of the brakes (for example in descent) causes overheating of the brake pad 1 which may then depolarize all or part of the active sensor(s) 15,15C embedded within the brake pads 1.

From the above description it is clear that the invention also relates to a vehicle braking system control method comprising the following steps:

i) providing at least one braking element with integrated sensor, such as the brake pad 1 comprising a plurality of spaced apart piezoceramic sensors 15, preferably arranged according to a symmetrical array, that can be individually activated, and an electrical circuit 18 which by means of the electrical cable 19 and connector 20 connects the piezoceramic sensors 15 to the central processing unit 22 or to any other equivalent central processing unit, for example one that is already built-in with the vehicle;

ii) processing of an electrical signal supplied by the electric circuit 18 and/or by each sensor 15 in response to the activation in real time of one or more of the piezoceramic sensors 15;

iii) detecting of whether or not the braking system has been activated, for example by querying the on-board computer 10;

iv) in the negative case, activating the signaling means 28, if present, or the actuating means 5 of the braking element with integrated sensor 1 so as to retract the braking element 1 away from the element to be braked, from the brake disc 3 in the example shown. As regards the first scenario, without affecting the actuating means 5, the user can be alerted to the fact that the brake caliper 4 is not correctly adjusted and that it is necessary to make an adjustment that will prevent premature wear and excessive fuel consumption. Within the context of this limited scope the brake pad 1 may feature only one sensor 15. As regards the second scenario, which is preferred, the problem will be directly solved in a completely automatic way;

v) in the positive case, where the activation of the braking system has been detected, determining whether the vehicle is braking in an abnormal way by means of a suitable processing of the electrical signal emitted in real time by a plurality of sensors 15 embedded within a single braking element 1 (for example the detection of any abnormal vibrations), by measuring the pressure with which the actuating means 5 is pushing, even locally, the braking element with integrated sensor 1 against the element to be braked 3 in a direction parallel to the axis A, and acting upon the individual actuating means 5 such that it no longer applies the aforementioned pressure (the pressure that triggered the abnormal phenomenon) applying instead another, greater or lesser pressure, depending on the vehicle driving conditions, thus allowing for the application of optimal pressure distribution. If the vehicle is not braking abnormally, the suitable processing of the electrical signals emitted in real time by a plurality of sensors 15 arranged on the braking element 1 will still provide useful information, such as to the on-board computer for example, in order to better handle emergency braking.

More generally, by means of the invention, in addition to fully automatically remedying poor caliper adjustment it will be possible to compensate for uneven wear of the brake pad friction material and above all to avoid the generation of noises/squeals/vibrations during braking that would otherwise be noticeable to the user.

The purposes of the invention are thus fully achieved.

Moreover, thanks to the presence of the electrical circuit 18 and the electrically insulating layer 12B, a wear sensor and/or a temperature sensor known in the art and not illustrated for simplicity, may be mounted before constructing the block 14 directly onto the backplate 11 with consequent significant cost savings and simplification of operations.

What is claimed is:

1. A method of controlling a braking system, the method comprising:
    with a processor, processing an electrical signal received from a braking element, the braking element comprising a support element, a friction material attached to the support element, and a piezoceramic sensor positioned between the support element and the friction material, the electrical signal generated in response to actuation of the piezoceramic sensor according to a piezoelectric effect;
    detecting whether or not the braking system has been activated; and
    in response to the processing and the detecting, controlling actuation of the braking element, wherein said controlling actuation of the braking element comprises, in response to determining that the piezoceramic sensor has been activated while the braking system has not been activated, retracting the braking element.

2. A method of controlling a braking system, the method comprising:
    with a processor, processing an electrical signal received from a braking element, the braking element comprising a support element, a friction material attached to the support element, and a piezoceramic sensor positioned between the support element and the friction material, the electrical signal generated in response to actuation of the piezoceramic sensor according to a piezoelectric effect;
    detecting whether or not the braking system has been activated; and
    in response to the processing and the detecting, activating a user alert relating to the braking system, wherein said activating a user alert comprises, in response to determining that the piezoceramic sensor has been activated while the braking system has not been activated, activating an alert indicating that the braking element is not correctly adjusted.

3. A method of controlling a braking system, the method comprising:
    with a processor, processing an electrical signal received from a braking element, the braking element comprising a support element, a friction material attached to the support element, and a piezoceramic sensor positioned between the support element and the friction material, the electrical signal generated in response to actuation of the piezoceramic sensor according to a piezoelectric effect;
    detecting whether or not the braking system has been activated; and
    in response to the processing and the detecting, controlling actuation of the braking element, wherein said controlling actuation of the braking element or comprises, in response to determining that the piezoceramic sensor has been activated while the braking system has also been activated, adjusting actuation of the braking element.

4. The method of claim 3, wherein said processing comprises measuring pressure applied by the braking element, and wherein said controlling actuation of the braking element or activating a user alert comprises adjusting pressure applied by the braking element.

5. A system for a motorized vehicle, the system comprising:
    a braking element comprising a support element, a friction material attached to the support element, and at least one piezoceramic sensor positioned between the support element and the friction material;
a processor configured to:
process an electrical signal generated in response to actuation of the at least one piezoceramic sensor according to a piezoelectric effect to determine that the at least one piezoceramic sensor has been activated;
determine whether or not a braking system including the braking element has been activated; and
control actuation of the braking element to retract the braking element in response to determining that the at least one piezoceramic sensor has been activated while the braking system has not been activated.

6. The system of claim 5 wherein the at least one piezoceramic sensor comprises a plurality of piezoceramic sensors.

7. The system of claim 6 wherein the plurality of piezoceramic sensors comprises four sensors arranged in a symmetric array.

8. The system of claim 6 wherein the plurality of piezoceramic sensors comprises five sensors including four sensors arranged symmetrically about a centrally located fifth sensor.

9. The system of claim 6 wherein the plurality of piezoceramic sensors comprise a plurality of pressure sensors and at least one shear sensor.

10. A system for a motorized vehicle, the system comprising:
a braking element comprising a support element, a friction material attached to the support element, and at least one piezoceramic sensor positioned between the support element and the friction material;
a processor configured to:
process an electrical signal generated in response to actuation of the at least one piezoceramic sensor according to a piezoelectric effect to determine that the at least one piezoceramic sensor has been activated;
determine whether or not a braking system including the braking element has been activated; and
activate an alert indicating that the braking element is not correctly adjusted in response to determining that the at least one piezoceramic sensor has been activated while the braking system has not been activated.

11. The system of claim 10 wherein the at least one piezoceramic sensor comprises a plurality of piezoceramic sensors.

12. The system of claim 11 wherein the plurality of piezoceramic sensors comprises four sensors arranged in a symmetric array.

13. The system of claim 11 wherein the plurality of piezoceramic sensors comprises five sensors including four sensors arranged symmetrically about a centrally located fifth sensor.

14. The system of claim 11 wherein the plurality of piezoceramic sensors comprise a plurality of pressure sensors and at least one shear sensor.

15. A system for a motorized vehicle, the system comprising:
a braking element comprising a support element, a friction material attached to the support element, and at least one piezoceramic sensor positioned between the support element and the friction material;
a processor configured to:
process an electrical signal generated in response to actuation of the at least one piezoceramic sensor according to a piezoelectric effect to determine that the at least one piezoceramic sensor has been activated;
determine whether or not a braking system including the braking element has been activated; and
control actuation of the braking element to adjust actuation of the braking element in response to determining that that the at least one piezoceramic sensor has been activated while the braking system has also been activated.

16. The system of claim 15 wherein the processor is configured to determine that the at least one piezoceramic sensor has been activated by processing the electrical signal to measure pressure applied by the braking element, and the processor is configured to control actuation of the braking element to adjust actuation of the braking element by adjusting pressure applied by the braking element.

17. The system of claim 15 wherein the at least one piezoceramic sensor comprises a plurality of piezoceramic sensors.

18. The system of claim 17 wherein the plurality of piezoceramic sensors comprises five sensors including four sensors arranged symmetrically about a centrally located fifth sensor.

19. The system of claim 17 wherein the plurality of piezoceramic sensors comprise a plurality of pressure sensors and at least one shear sensor.

* * * * *